United States Patent
Yang et al.

(10) Patent No.: US 10,220,481 B2
(45) Date of Patent: Mar. 5, 2019

(54) MACHINE CONTROL SYSTEM EMPLOYING LATHE TOOL AND MILLING CUTTER

(71) Applicant: FUXIANG PRECISION INDUSTRIAL (KUNSHAN) CO., LTD., Kunshan (CN)

(72) Inventors: Ming-Lu Yang, New Taipei (TW); Tian-En Zhang, Jiashan (CN); Wei-Chuan Zhang, Jiashan (CN); Jian-Shi Jia, Jiashan (CN); Yang-Mao Peng, Jiashan (CN); Jian Qu, Jiashan (CN); Feng-Hua Chen, Jiashan (CN); Zhen-Guang Xu, Jiashan (CN); Jing-Shuang Sui, Jiashan (CN); Da-Qing Zhuang, Jiashan (CN); Jie Li, Jiashan (CN); Yi Liu, Jiashan (CN); Jian-Min Yu, Jiashan (CN)

(73) Assignee: FUXIANG PRECISION INDUSTRIAL (KUNSHAN) CO., LTD., Kunshan (CN)

( * ) Notice: Subject to any disclaimer, the term of this patent is extended or adjusted under 35 U.S.C. 154(b) by 1134 days.

(21) Appl. No.: 14/070,722

(22) Filed: Nov. 4, 2013

(65) Prior Publication Data
US 2014/0172145 A1    Jun. 19, 2014

(30) Foreign Application Priority Data
Dec. 19, 2012    (CN) .......................... 2012 1 0554031

(51) Int. Cl.
*B23Q 1/01*    (2006.01)
*B23Q 39/02*   (2006.01)

(52) U.S. Cl.
CPC ........... *B23Q 39/024* (2013.01); *B23Q 1/012* (2013.01)

(58) Field of Classification Search
CPC .................................................... B23Q 15/007
(Continued)

(56) References Cited

U.S. PATENT DOCUMENTS 6,111,382 A *   8/2000   Tsutsui ................ G05B 19/186
                                                  318/569
7,508,116 B2 *  3/2009   Liu ....................... B23B 29/125
                                                  310/317

(Continued)

FOREIGN PATENT DOCUMENTS

CN    101332575 A    12/2008
CN    201217147 Y    4/2009
(Continued)

*Primary Examiner* — Sean Shechtman
(74) *Attorney, Agent, or Firm* — ScienBiziP, P.C.

(57) ABSTRACT

A machine control system includes an input module, a worktable, a first sliding module, a second sliding module, a lathe feeding module, a lathe tool connected to the lathe feeding module, a milling feeding module, a milling cutter connected to the milling feeding module, and a control module. The control module is electrically connected to the input module, the worktable, the first sliding module, the second sliding module, the lathe feeding module, and the milling feeding module, wherein the input module inputs control parameters into the control module to control the first sliding module and the second sliding module. The lathe feeding module controls the lathe tool to slide along a third direction perpendicular to the first direction and the second direction reciprocally, and the milling feeding module controls the milling cutter to slide along the third direction and rotate along a first axis.

20 Claims, 5 Drawing Sheets

(58) Field of Classification Search
USPC .......................................................... 700/160
See application file for complete search history.

(56) References Cited

U.S. PATENT DOCUMENTS

| | | | |
|---|---|---|---|
| 8,529,420 B2* | 9/2013 | Meidar | B23Q 1/012 |
| | | | 29/33 P |
| 2010/0268371 A1* | 10/2010 | Kasuya | B23B 3/30 |
| | | | 700/114 |
| 2010/0313718 A1 | 12/2010 | Meidar et al. | |
| 2014/0172145 A1* | 6/2014 | Yang | B23Q 39/024 |
| | | | 700/160 |
| 2014/0172146 A1* | 6/2014 | Yang | B23Q 39/024 |
| | | | 700/160 |

FOREIGN PATENT DOCUMENTS

| | | |
|---|---|---|
| CN | 101870063 B | 6/2012 |
| DE | 102009058649 A1 | 6/2011 |
| DE | 102011105402 A1 | 12/2012 |
| JP | S50-026176 | 3/1975 |
| JP | S62-259735 | 11/1987 |
| JP | H10-043906 | 2/1998 |
| JP | H11-309602 | 11/1999 |
| JP | 2000158256 A | 6/2000 |
| JP | 2004130468 A | 4/2004 |
| JP | 2007-210096 | 8/2007 |
| JP | 2008-183666 A | 8/2008 |
| JP | 2008-246594 | 10/2008 |
| JP | 2014-121782 | 7/2014 |
| TW | M276644 | 10/2005 |
| TW | M373247 U1 | 2/2010 |

* cited by examiner

MACHINE CONTROL SYSTEM EMPLOYING LATHE TOOL AND MILLING CUTTER

CROSS-REFERENCE TO RELATED APPLICATIONS

This application claims all benefits accruing under 35 U.S.C. § 119 from China Patent Application No. 201210554031.2, filed on Dec. 19, 2012, in the China Intellectual Property Office, the disclosure of which is incorporated herein by reference. The application is also related to co-pending applications entitled, "METHOD FOR MACHINING METALLIC MEMBER USING LATHING AND MILLING"; "METHOD FOR MACHINING METALLIC MEMBER USING LATHING AND MILLING"; "METHOD FOR MACHINING METALLIC MEMBER USING LATHING AND SCRAPING"; "METHOD FOR MACHINING METALLIC MEMBER USING LATHING AND SCRAPING"; "METHOD FOR MACHINING METALLIC MEMBER USING LATHING AND SCRAPING"; "MACHINE TOOL WITH LATHE TOOL AND MILLING CUTTER"; "MACHINE TOOL WITH LATHE TOOL AND SCRAPING CUTTER"; "MACHINE CONTROL SYSTEM EMPLOYING LATHE TOOL AND SCRAPING CUTTER", "MILLING METHOD FOR MACHINING METALLIC MEMBER".

BACKGROUND

1. Technical Field

The present disclosure generally relates to cutting machine control system, and particularly, to a machine control system employing lathe tool and milling cutter.

2. Description of the Related Art

CNC (computer numerical control) machine is an important device in manufacturing fields and usually is employed to machine workpiece. The CNC machine may be adapted for one machine method to machine a workpiece. However, due to the limitation of the machine method and the surface finish requirement of the workpiece, it may be difficult to satisfy all the machine requirement of the workpiece using only one machine method. The workpiece may undergo a number of machine methods to obtain a surface finish as required.

For example, an electronic device such as a desktop computer or a mobile phone may have a machined housing made of metal. The metallic housing includes a top portion and a peripheral sidewall extending from a peripheral edge of the top portion. The top portion has a greater surface area than that of the peripheral sidewall and has a non-circular flat surface or non-circular curved surface. The peripheral sidewall has four side surfaces arranged in order and adjacent two side surfaces are connected by corners. In related manufacturing fields, if a milling machine is employed to machine the metallic housing, some tracks remain on the top portion that has been milled because of intermittent contact and interrupted milling by the milling cutter. Then a milling process needs to be applied for a better appearance. Therefore, using the milling process may not be efficient. If a lathe machine is employed to machine the metallic member, it is difficult to machine a surface which is not circular. The lathe is not suitable to machine the peripheral sidewalls because of the four corners of the peripheral sidewall. Thus a number of additional machining processes must be added to machine the metallic housing. Machining the electronic devices using a lathe is time-consuming.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
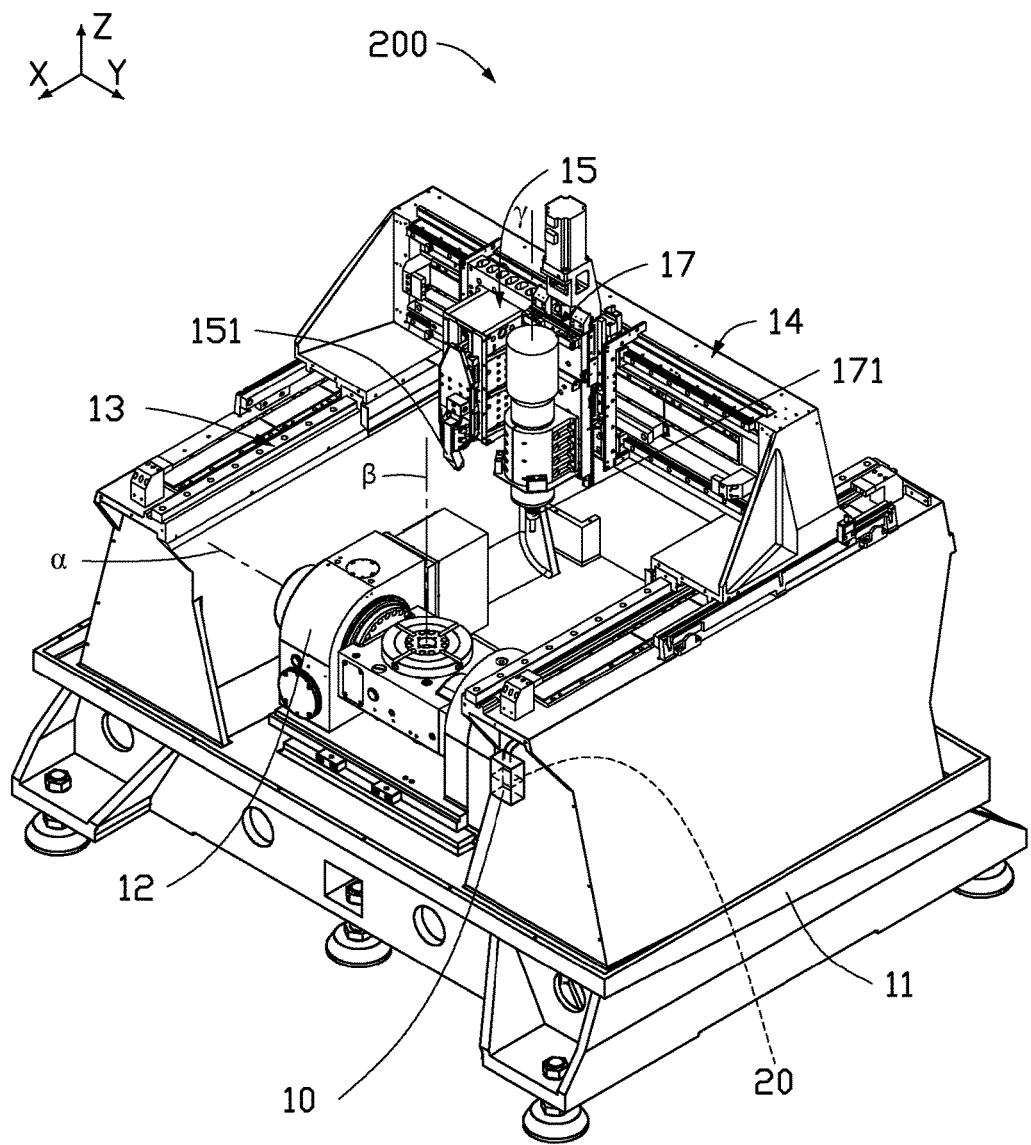
FIG. 1 is an isometric view of an embodiment of a machine.
Figure 3:
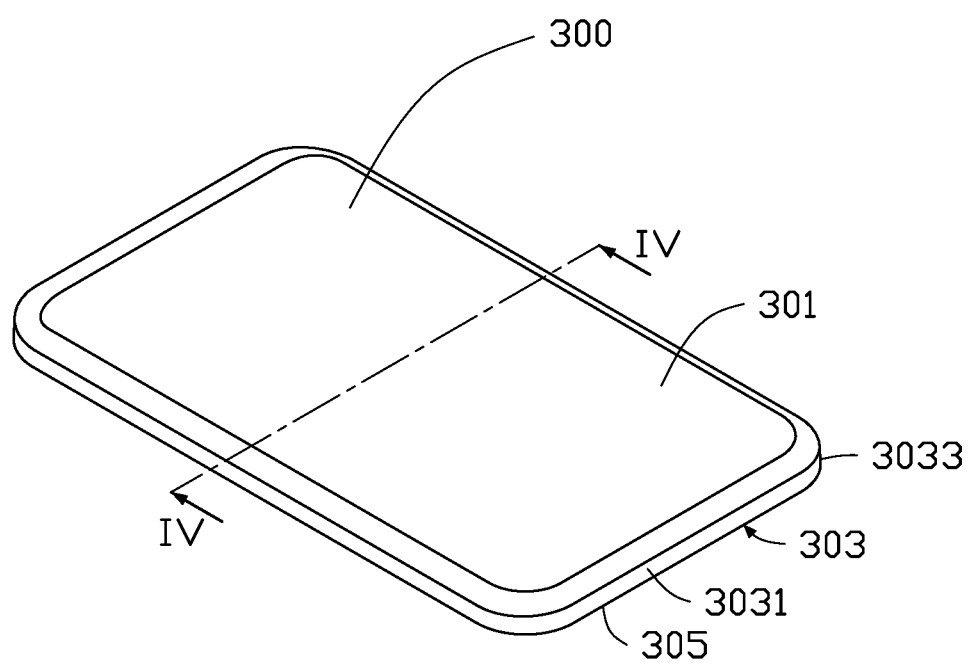
FIG. 3 is an isometric view of a metallic member to be machined.

FIG. 1 shows an embodiment of a machine 200 for machining a metallic member 300 (see FIG. 3). The machine 200 includes an input module 10, a machine support 11, a worktable 12, a first sliding module 13, a second sliding module 14, a lathe feeding module 15, a milling feeding module 17, and a control module 20 electrically connected to the input module 10. The input module 10 is mounted on a side of the machine support 11. The control module 20 is mounted on a side of the input module 10 and is electrically connected to the input module 10. The worktable 12 is rotatably mounted on the machine support 11. The first sliding module 13 is slidably mounted on the machine support 11 and is positioned above the worktable 12. The second sliding module 14 is sidably mounted on the first sliding module 13. The lathe feeding module 15 and the milling feeding module 17 are arranged side by side and slidably mounted on the second sliding module 14. The metallic member 300 is held on the worktable 12. A lathe tool 151 is assembled to the lathe feeding module 15, a milling cutter 171 is assembled to the milling feeding module 17. The first sliding module 13, the second sliding module 14, the lathe feeding module 15, and the milling feeding module 17 are electrically connected to the control module 20. Under the control of the control module 20, the first sliding module 13 drives the second sliding module 14 to move along the X axis (a first direction). The second sliding module 14 moves the lathe feeding module 15 and the milling feeding module 17 along the Y axis (a second direction). The lathe feeding module 15 drives the lathe tool 151 to slide along the Z axis (a third direction) reciprocating at a high speed. The milling feeding module 17 drives the milling cutter 171 to slide along the Z axis and rotates the milling cutter 171 along a γ axis (parallel to the third direction). The worktable 12 rotates the metallic member 300 along a α axis (parallel to the second direction) and a β axis (parallel to the third direction).

Figure 4:
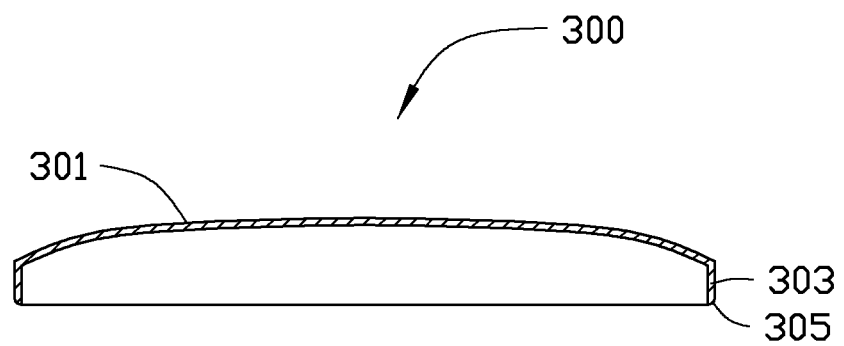
FIG. 4 is a sectional view of the metallic member of FIG. 3, taken along line IV-IV of FIG. 3.

FIGS. 3 and 4 shows that the metallic member 300 to be machined is a housing of a mobile phone. The metallic member 300 is substantially rectangular and hollow, and includes a top portion 301 and a peripheral sidewall 303 extending from a peripheral edge of the top portion 301. The top portion 301 has a curved surface with a relatively greater surface area than that of the peripheral sidewall 303, the curved surface is a non-rotatable three-dimensional curved surface. The peripheral sidewall 303 has four side surfaces 3031 arranged in order and every two of the adjacent side surfaces 3031 are connected by a corner 3033. The four side surfaces 3031 are substantially flat surfaces, each corner 3033 interconnects two adjacent side surfaces 3031. The peripheral sidewall 303 further includes an end edge 305 away from the top portion 301. The top portion 301, the peripheral sidewall 303 and the end edge 305 of the metallic member 300 are to be machined by the machine 200 in that order.

Figure 2:
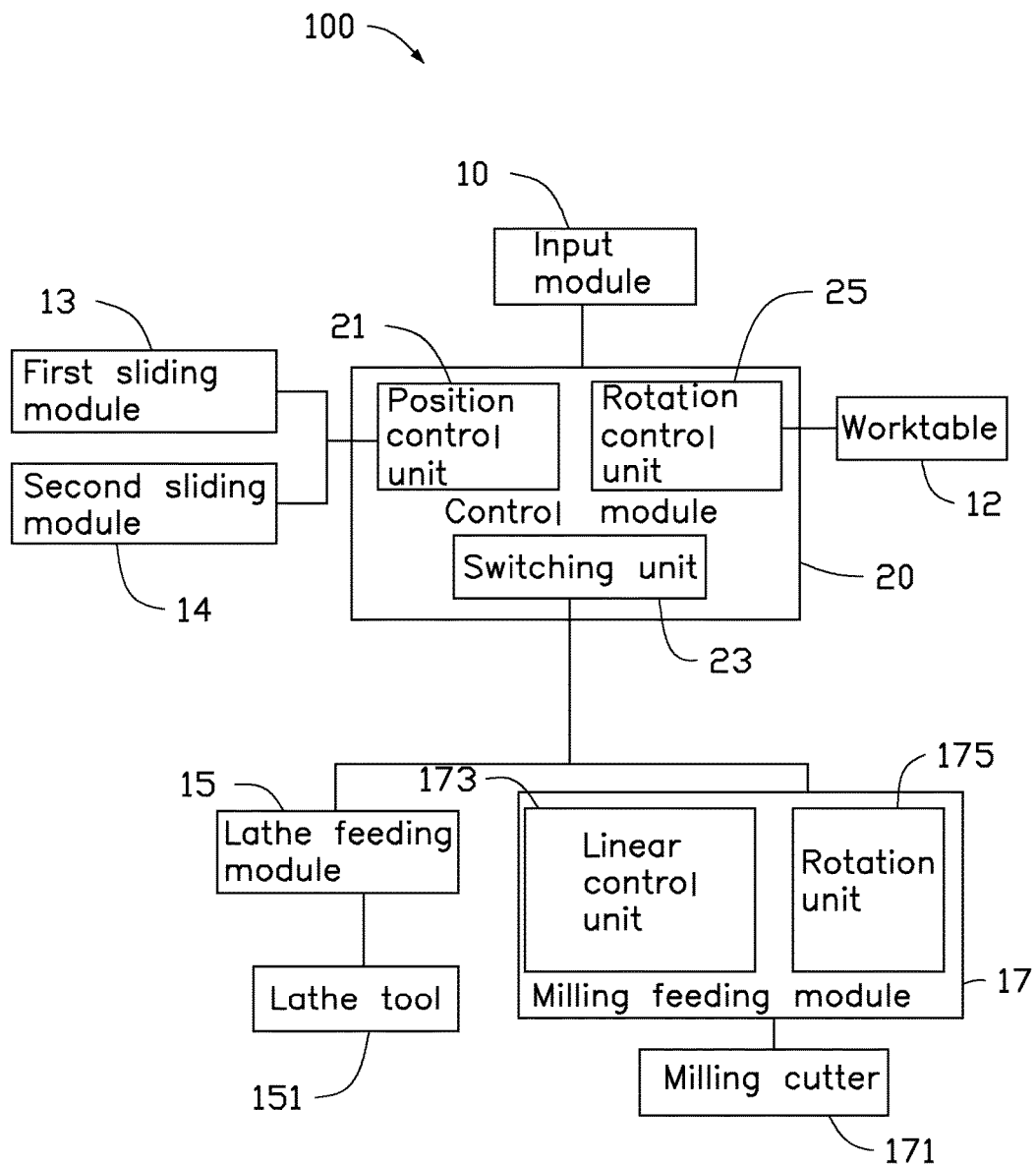
FIG. 2 is a machine control system adapted by the machine of FIG. 1.

FIG. 2 shows a machine control system 100 adapted by the machine 200 for machining the metallic member 300. The machine control system 100 is a modularization of the machine 200, and includes the input module 10, the control module 20, the worktable 12, the first sliding module 13, the second sliding module 14, the lathe feeding module 15, and the milling feeding module 17.

The input module 10 is electrically connected to the control module 20 for entering a number of control parameters and transferring the control parameters to the control module 20. The control parameters include moving range, moving speed of the lathe feeding module 15 and the milling feeding module 17 along the X axis and the Y axis, frequency and moving range of the lathe tool 151 along the Z axis, as well as the rotating speed of the milling cutter 171 along the γ axis, and the rotating speed of the worktable 12.

The control module 20 is assembled to the input module 10 and electrically connected to the input module 10. The control module 20 is further electrically connected to the worktable 12, the first sliding module 13, the second sliding module 14, the lathe feeding module 15, the lathe tool 151, the milling feeding module 17, and the milling cutter 171 for controlling the machine 200. The control module 20 includes a position control unit 21, a switching unit 23, and a rotation control unit 25. The position control unit 21 is electrically connected to the first sliding module 13 and the second sliding module 14, to control the first sliding module 13 and the second sliding module 14 to move the lathe feeding module 15, and the milling feeding module 17 along the X/Y axis. The switching unit 23 is electrically connected to the lathe feeding module 15 and the milling feeding module 17, for switching executing between the lathe feeding module 15 and the milling feeding module 17. The rotation control unit 25 is electrically connected to the worktable 12 to control the rotation of the worktable 12. In the embodiment, the rotation speed of the worktable 12 along the β axis is 100~900 round/minute. The lathe tool 151 is assembled to a tool holder (not labeled) of the lathe feeding module 15, the milling cutter 171 is rotatably assembled to the milling feeding module 17.

The lathe feeding module 15 drives the lathe tool 151 to move along the Z axis reciprocally at a high frequency about 500-3200 Hz. The milling feeding module 17 further includes a linear control unit 173 and a rotation unit 175. The linear control unit 173 drives the milling cutter 171 to move along the Z axis. The rotation unit 175 rotates the milling cutter 171 along the γ axis.

In the embodiment, when manually inputting control parameters into the input module 10. First, the machine movement of the machine 200 is simulated to machine the top portion 301, the peripheral sidewall 203, and the end edge 305, thereby obtaining a number of control parameters. Then, the control parameters of machining the top portion 301, the peripheral sidewall 203, and the end edge 30 are typed into the input module 10, that is, typing the control parameters of different machine process, such as moving ranges, moving speeds of the lathe feeding module 15 and the milling feeding module 17 along the X axis and the Y axis, frequency and moving range of the lathe tool 151 along the Z axis, rotating speed of the milling cutter 171 along the γ axis, and the rotating speed of the worktable 12. The surface finish of the top portion 301 is 0.2~1 micrometer.

During the process of machining the top portion 301 using the machine 200, the peripheral sidewall 303, and the end edge 305 can illustrate the control procedure of the machine control system 100.

First, the control parameters are input into the input module 10 to control the machine process for machining the top portion 301 of the metallic member 300. In detail, typing the moving ranges of the lathe feeding module 15 along the X axis and the Y axis, the moving speed V1, the machining time t1 of the lathe tool 151 into the input module 10. The original machine point of the metallic member 300 is located at a middle of an edge of the metallic member 300 which is arranged parallel to the X axis. The terminal machine point of the metallic member 300 is located at a center of the metallic member 300, such that, when starting machining, the lathe tool 151 just moves along the Y axis toward the center of the metallic member 300. Typing the frequency f, the moving range H of the lathe tool 151 along the Z axis, and the rotating speed of the worktable 12 r1 into the input module 10. The moving range H of the lathe tool 151 along the Z axis is decreased along the Y axis toward the center of the metallic member 300 automatically, according to a preset mode. In the embodiment, the rotating speed r1 of the worktable 12 along the α axis is up to 600 round/minute. The frequency f of lathe tool 151 along the Z axis is 2500 Hz.

Input control parameters into the input module 10 to control the machine process for machining the peripheral sidewall 303 of the metallic member 300. In detail, typing the moving ranges of the milling feeding module 17 along the X axis and the Y axis, the moving speed V2, the machining time t2 of the milling cutter 171 machining the peripheral sidewall 303, the rotating speed r2 of the milling cutter 171 into the input module 10, and selecting the predetermined machining path of the milling cutter 171 in the input module 10. Then, the milling cutter 171 machines the peripheral sidewall 303 one by one automatically.

Input control parameters into the input module 10 to control the machine process for machining the end edge 305 of the metallic member 300. In detail, typing the rotating angles of the worktable 12 along the α and β axis, the moving ranges of the milling feeding module 17 along the X axis and the Y axis, the moving speeds V3 of the milling cutter 171 along the X axis and the Y axis, the machining time t3 of the milling cutter 171 machining the peripheral sidewall 303, the rotating speed r3 of the milling cutter 171 into the input module 10, and selecting the predetermined machining path of the milling cutter 171 in the input module 10. Then, the milling cutter 171 machines the end edge 305 along a periphery of the metallic member 300.

The switching unit 23 transmits control signals to the position control unit 21 and the lathe feeding module 15. The position control unit 21 controls the first sliding module 13 to drive the lathe feeding module 15 along the Y axis. In addition, controls the second sliding module 14 to drive the lathe feeding module 15 to move along the X axis, thereby positioning the lathe tool 151 above a middle of an edge of the top portion 301 parallel to the X axis. Then, the position control unit 21 controls the second sliding module 14 to drive the lathe feeding module 15 to move along the Y axis at a moving speed v1 automatically. Simultaneously, the rotating control unit 25 controls the worktable 12 to rotate the metallic member 300 along the α axis at a rotation speed r1 round/minute, and the control module 20 controls the lathe feeding module 15 to drive the lathe tool 151 to move along the Z axis reciprocally at a frequency f and a moving range H. The moving range H is changed due to the Y position of the lathe tool 151 automatically.

Figure 5:
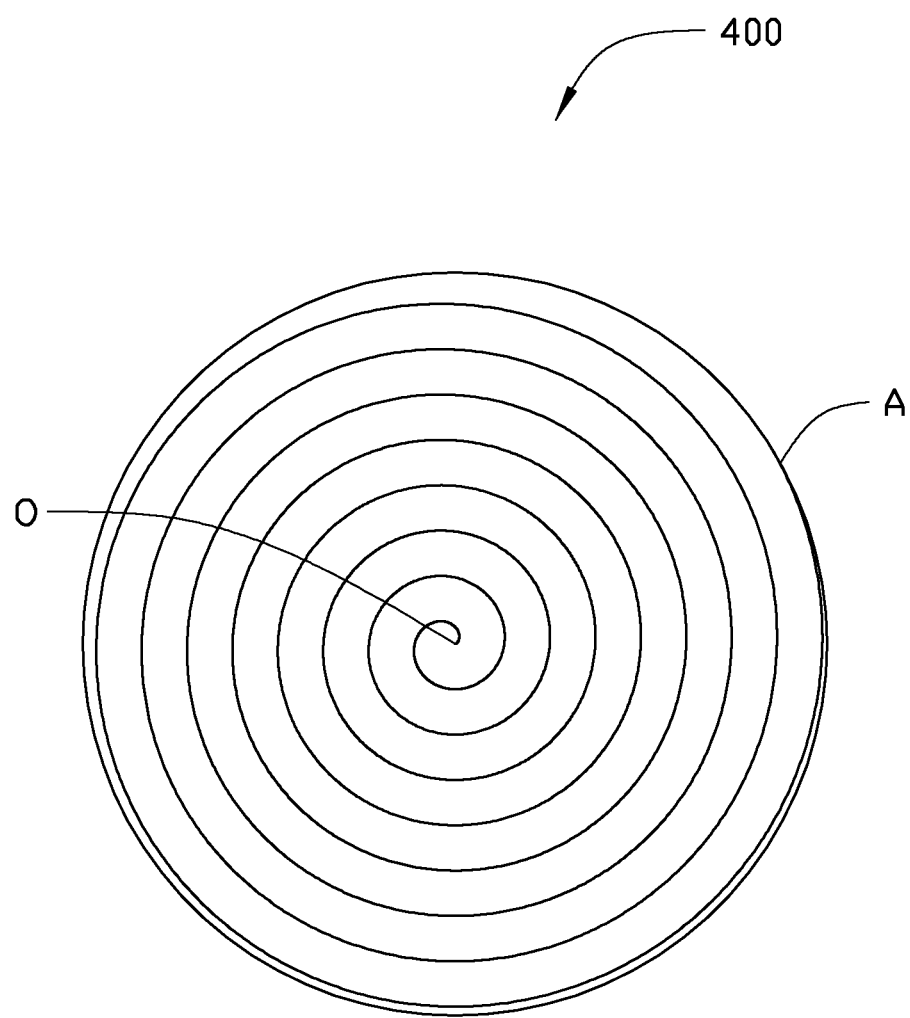
FIG. 5 is a movement track of a lathe tool employed by the machine control system.

Also referring to FIG. 5, in the machining procedure of the lathe tool 151 machining the top portion 301, the movement track 400 of the lathe tool 151 projected on the top portion 301 is spiral. The lathe tool 151 is moved from a point A on the edge of the top portion 301 toward the central point O of the top portion 301 along the spiral movement track 400, thereby finishing the machining of the top portion 301. In the embodiment, the surface finish of the top portion 301 is about 0.25~0.3 micrometer.

When the lathe tool 151 machines the top portion 301 for t1 minutes, the switching unit 23 transfers signal to the position control unit 21 and the milling feeding module 17. The position control unit 21 controls the lathe feeding module 15 to move away from the metallic member 300, and controls the first sliding module 13 and the second sliding module 14 to drive the milling feeding module 17 toward the metallic member 300 along the X axis and the Y axis, till the milling feeding module 17 arrives at the peripheral sidewall 303 of the metallic member 300. The milling feeding module 17 drives the milling cutter 171 to mill the peripheral sidewall 303.

In the milling process, the milling cutter 171 mills the peripheral sidewall 303. First, the linear control unit 173 controls the milling cutter 171 to move along the Z axis till the milling cutter 171 arrives at a predetermined position of the peripheral sidewall 303. Then, the rotation unit 175 rotates the milling cutter 171 along the γ axis at a rotation speed r2 to mill the peripheral sidewall 303, simultaneously, the first sliding module 13 and the second sliding module 14 drives the milling cutter 171 to move relative to the metallic member 300 along the X axis and the Y axis at a speed v2 according a predetermined path, and the milling feeding module 17 controls a feed of the milling cutter 171 relative to the metallic member 300, thereby finishing the milling of the peripheral sidewall 303. In the embodiment, the worktable 90 remains still. The rotating control unit 25 may transmit signal the worktable 12 to rotate along the α axis to match the milling cutter 171 milling the peripheral sidewall 303. In the embodiment, the surface finish of the peripheral sidewall 303.

When the milling cutter 171 mills the peripheral sidewall 303 for t2 minutes, the position control unit 21 transmits a signal to the first sliding module 13 and the second sliding module 14. So, the first sliding module 13 and the second sliding module 14 drive the milling feeding module 17 away from the metallic member 300. In addition, the milling feeding module 17 holds to stop rotating and milling. The rotating control unit 25 controls the worktable 12 to rotate along the α axis to turn the end edge 305 toward the milling cutter 171. Then, the first sliding module 13 and the second sliding module 14 drive the milling feeding module 17 toward the end edge 305 till the milling cutter 171 resists a preset portion on the end edge 305. The first sliding module 13 and the second sliding module 14 drive the milling cutter 171 to move along a predetermined path at speed V3, simultaneously, the rotation unit 175 rotates the milling cutter 171 at a rotation speed r3 round/minute and the milling feeding module 17 controls a chamfering feed of the milling cutter 171 relative to the metallic member 300. When the chamfering of a side of the end edge 305 is finished, the rotation control unit 25 transmits a control signal to the worktable 12 and rotates the worktable 12 along the α axis and the β axis to adjust a position of the metallic member 300, thereby enabling a side of the end edge 305 to be moved to face the milling cutter 171. The first sliding module 13 and the second sliding module 14 drive the milling cutter 171 to move to chamfer the end edge 305 in similar procedure, until the chamfering of the end edge 305 of the metallic member 300 is finished.

The machine control system 100 may first mill the peripheral sidewall 303 and the end edge 305, then the top portion 301 is machined by the lathe tool 151. The worktable 12 has multi-axis rotation under the control of the rotating control unit 25. The milling feeding module 14 moves along a determined path to match the multi-axis rotation of the worktable 12 to mill the metallic member 300.

Changing a relation between the frequency f and the moving range H, the machine control system 100 machines the top portion 301 into different shapes with the lathe tool 151.

When machining the top portion 301, the original machine point of the metallic member 300 may be located at a middle of an edge of the top position 301 parallel to the Y axis. The terminal machine point of the metallic member 300 is located at a central of the top portion 301 of the metallic member 300, such that the lathe tool 151 moves along the X axis toward the central of the top portion 301. In other embodiment, the original machine point may be located at the central of the top portion 301, and the terminal machine point may be located at the edge of the top portion 301.

The machine control system 100 machines the top portion 301, the peripheral sidewall 303, and the end edge 305 at the same time and obtains a high surface finish. When the first sliding module 13 moves the lathe feeding module 15 along the X axis or the second sliding module 14 moves the lathe feeding module 15 along the Y axis, simultaneously, the lathe feeding module 15 drives the lathe tool 151 to move along the Z axis reciprocally at a high speed, thus the lathe tool 171 machine the top portion 301 continuously in a spiral track, thereby obtaining a high surface finish on the top portion 301. The milling feeding module 17 drives the milling cutter 171 along the predetermined path to mill the peripheral sidewall 303 of the metallic member 300. Then the rotation control unit 25 controls the worktable 12 to rotate, thereby matching the milling feeding module 17 to chamfer the end edge 305.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A machine control system employing a lathe tool and a milling cutter, the machine control system being configured for machining a metallic member including a top portion having a curved surface and a peripheral sidewall extending from a peripheral edge of the top portion, the machine control system comprising:
 an input module;
 a worktable;
 a first sliding module;
 a second sliding module;
 a lathe feeding module, the lathe tool connected to the lathe feeding module;

a milling feeding module, the milling cutter connected to the milling feeding module; and a control module electrically connected to the input module, the worktable, the first sliding module, the second sliding module, the lathe feeding module, and the milling feeding moduled;

wherein the first sliding module is controlled by the input module inputting control parameters, the first sliding module drives the second sliding module to slide along a first direction, the control module controls the second sliding module, the second sliding module drives the lathe feeding module and the milling feeding module to slide along a second direction perpendicular to the first direction, the lathe feeding module drives the lathe tool to slide reciprocally, along a third direction perpendicular to the first direction and the second direction, at a frequency between about 500-3200 Hz relative to the worktable thereby lathing the top portion of the metallic member during the machining process;

wherein during lathing process, the lathe feeding module drives the lathe tool to slide reciprocally and consistently, and the worktable drives the metallic member to rotate, thereby consistently lathing the top portion of the metallic member;

wherein a moving distance of the lathe tool in the third direction when driven by the lathe feeding module is changed while the lathe tool is driven by the first sliding module to move towards the first direction or the lathe tool is driven by the second sliding module to move towards the second direction such that the curved surface is processed; and wherein the milling feeding module controls the milling cutter to slide along the third direction and rotate along a first axis parallel to the third direction to mill the peripheral sidewall of the metallic member.

2. The machine control system of claim 1, wherein the milling feeding module comprises a linear controlling unit and a rotation unit, the linear controlling unit controls the milling cutter to move along the third direction, and the rotation unit controls the milling cutter to rotate along the first axis.

3. The machine control system of claim 1, wherein the control module comprises a position controlling unit and a switching unit, the position controlling unit is electrically connected to the first sliding module and the second sliding module, the position control unit controls the first sliding module and the second sliding module to move the lathe feeding module and the milling feeding module along the first direction and the second direction, the switching unit is electrically connected to the lathe feeding module and the milling feeding module, the switching unit switches executions between the lathe feeding module and the milling feeding module.

4. The machine control system of claim 1, wherein the control module further comprises a rotating controlling unit electrically connected to the worktable, the rotating controlling unit controls the worktable to rotate along a second axis parallel to the third direction.

5. The machine control system of claim 4, wherein the rotating controlling unit controls the worktable to rotate along the second axis and simultaneously controls the worktable to rotate along a third axis parallel to the second direction.

6. The machine control system of claim 1, wherein the control parameters comprise moving ranges, moving speeds of the lathe feeding module and the milling feeding module along the first direction and the second direction, frequency and moving ranges of the lathe tool along the third direction, rotating speed of the milling cutter along the first axis, and a rotating speed of the worktable.

7. The machine control system of claim 1, wherein the control module controls the milling feeding module to slide along the first direction and the second direction and simultaneously controls the milling feeding module to rotate the milling cutter along the first axis.

8. The machine control system of claim 4, wherein the rotating speed of the worktable along the second axis is between about 100-900 rotations/minute.

9. The machine control system of claim 4, wherein the control module controls the lathe feeding module to slide along the first direction and the second direction and simultaneously controls the lathe feeding module to drive the lathe tool to move along the third direction reciprocally.

10. The machine control system of claim 9, wherein a moving range of the lathe tool moving reciprocally along the third direction perpendicular to the first and the second direction is changed.

11. A machine control system employing a lathe tool and a milling cutter, the machine control system being configured for machining a metallic member including a top portion having a curved surface and a peripheral sidewall extending from a peripheral edge of the top portion, the machine control system comprising:

an input module;
a worktable;
a first sliding module;
a second sliding module;
a lathe feeding module, the lathe tool assembled to the lathe feeding module;
a milling feeding module, the milling cutter assembled to the milling feeding module, and
a control module electrically connected to the input module, the worktable, the first sliding module, the second sliding module, the lathe feeding module, and the milling feeding module;

wherein the control module controls the first sliding module, the first sliding module drives the second sliding module to slide along a first direction, the first sliding module controls the second sliding module to drive the lathe feeding module and the milling feeding module to slide along a second direction perpendicular to the first direction, the lathe feeding module drives the lathe tool to slide reciprocally, along a third direction perpendicular to the first direction and the second direction, at a frequency between about 500-3200 Hz relative to the worktable thereby lathing the top portion of the metallic member during the machining process;

wherein during lathing process, the lathe feeding module drives the lathe tool to slide reciprocally and consistently, and the worktable drives the metallic member to rotate, thereby consistently lathing the top portion of the metallic member;

wherein a moving distance of the lathe tool in the third direction when driven by the lathe feeding module is changed while the lathe tool is driven by the first sliding module to move towards the first direction or the lathe tool is driven by the second sliding module to move towards the second direction such that the curved surface is processed;

wherein the milling feeding module controls the milling cutter to slide along the third direction and rotate along a first axis parallel to the third direction, the control module controls the worktable to rotate along a second axis parallel to the third direction to mill the peripheral sidewall of the metallic member; and wherein when the lathe tool is in a machining mode, a reciprocally moving range of the lathe tool along the third direction is changed with position changes of the lathe tool along the first or second direction.

12. The machine control system of claim 11, wherein the milling feeding module comprises a linear controlling unit and a rotation unit, the linear controlling unit controls the milling cutter to move along the third direction, and the rotation unit controls the milling cutter to rotate along the first axis.

13. The machine control system of claim 11, wherein the control module comprises a position controlling unit and a switching unit, the position controlling unit is electrically connected to the first sliding module and the second sliding module, the position control unit controls the first sliding module and the second sliding module to move the lathe feeding module and the milling feeding module along the first direction and the second direction, the switching unit is electrically connected to the lathe feeding module and the milling feeding module, the switching unit switches executions between the lathe feeding module and the milling feeding module.

14. The machine control system of claim 11, wherein the control module further comprises a rotating controlling unit electrically connected to the worktable, the rotating controlling unit controls the worktable to rotate along the second axis parallel.

15. The machine control system of claim 11, wherein the control module controls the milling feeding module to slide along the first direction and the second direction, and simultaneously controls the milling feeding module to rotate the milling cutter along the first axis.

16. The machine control system of claim 11, wherein the input module inputs control parameters into the controlling module, the control parameters comprise moving ranges, moving speeds of the lathe feeding module and the milling feeding module along the first direction and the second direction, frequency and moving ranges of the lathe tool along the third direction, rotating speed of the milling cutter along the first axis, and a rotating speed of the worktable.

17. The machine control system of claim 16, wherein the rotating speed of the worktable along the second axis is between about 100-900 rotations/minute.

18. The machine control system of claim 14, wherein the rotating controlling unit controls the worktable to rotate along the second axis, and simultaneously controls the worktable to rotate along a third axis parallel to the second direction, and the rotating speed of the worktable along the second axis is between about 100-900 rotations/minute.

19. The machine control system of claim 14, wherein the control module controls the lathe feeding module to slide along the first direction and the second direction, and simultaneously controls the lathe feeding module to drive the lathe tool to move along the third direction reciprocally.

20. The machine control system of claim 19, wherein a moving range of the lathe tool moving reciprocally along the third direction perpendicular to the first direction and the second direction automatically is changed, according to a preset mode.

* * * * *